United States Patent [19]

Homan et al.

[11] Patent Number: 5,669,844
[45] Date of Patent: Sep. 23, 1997

[54] LUBRICATION SYSTEM FOR A PARALLEL-AXIS DIFFERENTIAL

[75] Inventors: Akinori Homan; Kiyonari Ishikawa, both of Toyota; Hirofumi Okuda, Saitama-ken, all of Japan

[73] Assignees: Toyota Jidosha Kabushiki Kaisha, Aichi-ken; Zexel Corporation, Tokyo, both of Japan

[21] Appl. No.: 547,610

[22] Filed: Oct. 24, 1995

[30] Foreign Application Priority Data

Nov. 16, 1994 [JP] Japan .................... 6-306984

[51] Int. Cl.$^6$ .................................................. F16H 57/04
[52] U.S. Cl. ........................... 475/160; 475/252; 184/6.12
[58] Field of Search ............................... 475/159, 160, 475/248, 252; 184/6.12, 11.1, 13.1

[56] References Cited

U.S. PATENT DOCUMENTS

| | | | |
|---|---|---|---|
| 3,429,400 | 2/1969 | Engle et al. | 184/11 |
| 5,232,417 | 8/1993 | Amborn et al. | 475/252 |
| 5,292,291 | 3/1994 | Ostertag | 475/252 |
| 5,310,389 | 5/1994 | Sato | 475/252 |
| 5,389,048 | 2/1995 | Carlson | 475/252 |

FOREIGN PATENT DOCUMENTS

| | | | |
|---|---|---|---|
| 22 19 258 | 11/1972 | Germany . | |
| 29 45 226 C2 | 5/1980 | Germany . | |
| 63-38586 | 8/1988 | Japan . | |
| 4-19943 | 2/1992 | Japan . | |
| 5-280596 | 10/1993 | Japan . | |
| 6-18083 | 5/1994 | Japan . | |
| 1620339 | 1/1991 | U.S.S.R. | 475/160 |

Primary Examiner—Charles A. Marmor
Assistant Examiner—Nathan O. Jensen

[57] ABSTRACT

In a parallel-axis differential, a pair of sun gears are received in a housing in a coaxial relation. Also, at least a pair of planetary gears are received in the housing in parallel relation with the sun gears. The planetary gears of the pair are in engagement with the pair of sun gears, respectively and also in engagement with each other. A window opening for introducing lubricating oil is formed in the housing. Also, a fin for guiding the lubricating oil toward the window opening is formed on the outer surface of the housing. The fin is situated on the rear side of the window opening with reference to one rotating direction of said housing.

8 Claims, 5 Drawing Sheets

LUBRICATION SYSTEM FOR A PARALLEL-
AXIS DIFFERENTIAL

BACKGROUND OF THE INVENTION

This invention relates to a parallel-axis differential having sun gears and planetary gear which are mutually in parallel relation.

As disclosed in Japanese Laid-Open Patent Application No. Hei 5-280596, the parallel-axis differential for vehicles includes a housing received in a differential carrier and rotationally driven by an engine, a pair of sun gears rotatably received in and coaxial with the housing, and plural pairs of planetary gears rotatably supported within the housing and being in parallel relation with the sun gears. The planetary gears of each pair are in engagement with the pair of sun gears, respectively, and also in engagement with each other. The pair of sun gears are connected with end portions of a pair of coaxial output shafts, respectively.

In the above differential, when in differential rotation, one sun gear having a larger load is rotated at a lower speed than the housing and the other sun gear having a smaller load is rotated at a higher speed than the housing. It is designed such that driving torque transmitted to the housing is distributed to the pair of sun gears at a ratio called "torque bias ratio" due to friction generated between one end faces of the pair of sun gears, between the other end faces of the pair of sun gears and an inner surface of the housing, between one end face of each planetary gear and the inner surface of the housing, and between an outer peripheral surface of each planetary gear and the inner surface of the housing.

In the differential disclosed by the Japanese Laid-Open Patent Application No. Hei 5-280596, window openings are formed in a peripheral wall and end walls of the housing. In accordance with rotation of the housing, lubricating oil stored on a bottom portion of the differential carrier is brought into the housing through the window openings in order to lubricate and cool the mating surfaces where the friction is generated, engaging portions between the gears, etc.

In the above parallel-axis differential, the outer peripheral surface of each planetary gear is in contact with the inner surface of the housing. Owing to the necessity for obtaining this contact area, it is practically impossible to form large window openings in the peripheral wall of the housing. Therefore, it is demanded to fulfill the requirement to supply a sufficient amount of lubricating oil into the housing through even small window openings.

In Japanese Laid-Open Utility Model Application No. Hei 4-19943 and Japanese Utility Model Publication No. Hei 6-18083, there is disclosed a differential of the type in which axes of planetary gears are skewed with a co-axis of sun gears. In this differential, a housing has fins projecting radially outwardly from a peripheral wall thereof, so that lubricating oil stored in a differential carrier can be guided toward window openings. FIG. 2 of the above Japanese Utility Model Publication No. Hei 6-18083, especially, shows a fin formed on an edge portion of the window opening which edge portion is situated on a rear side in a rotating direction of the housing.

Also, in Japanese Patent Publication No. Sho 63-38586, there is disclosed a differential of the type in which axes of planetary gears and a co-axis of sun gears are intersected at right angles. FIG. 5 of this publication, especially, shows a lubricating oil guiding fin formed on an edge portion of a window opening which edge portion is situated on a rear side in a rotating direction of a housing.

However, with respect to the parallel-axis differential, no differential having a fin of the type as mentioned has been developed.

SUMMARY OF THE INVENTION

It is, therefore, an object of the present invention to provide a parallel-axis differential capable of supplying a plenty of lubricating oil into a housing through window openings.

According to the present invention, there is provided a parallel-axis differential, comprising:

(a) a housing rotatable about a rotational axis upon receipt of a rotational torque, the housing having a window opening for allowing the passage of lubricating oil;

(b) a pair of sun gears rotatably received in the housing and coaxial with the housing, the pair of sun gears being connected with end portions of a pair of coaxial output shafts, respectively;

(c) at least a pair of planetary gears rotatably received in the housing and being parallel with the rotational axis of the housing, the planetary gears of the pair being in engagement with the pair of sun gears, respectively and also in engagement with each other; and (d) a fin mounted on an outer surface of the housing, the fin being disposed on the rear side of the window opening with reference to one rotating direction of the housing.

DETAILED DESCRIPTION OF THE EMBODIMENT

Figure 1:
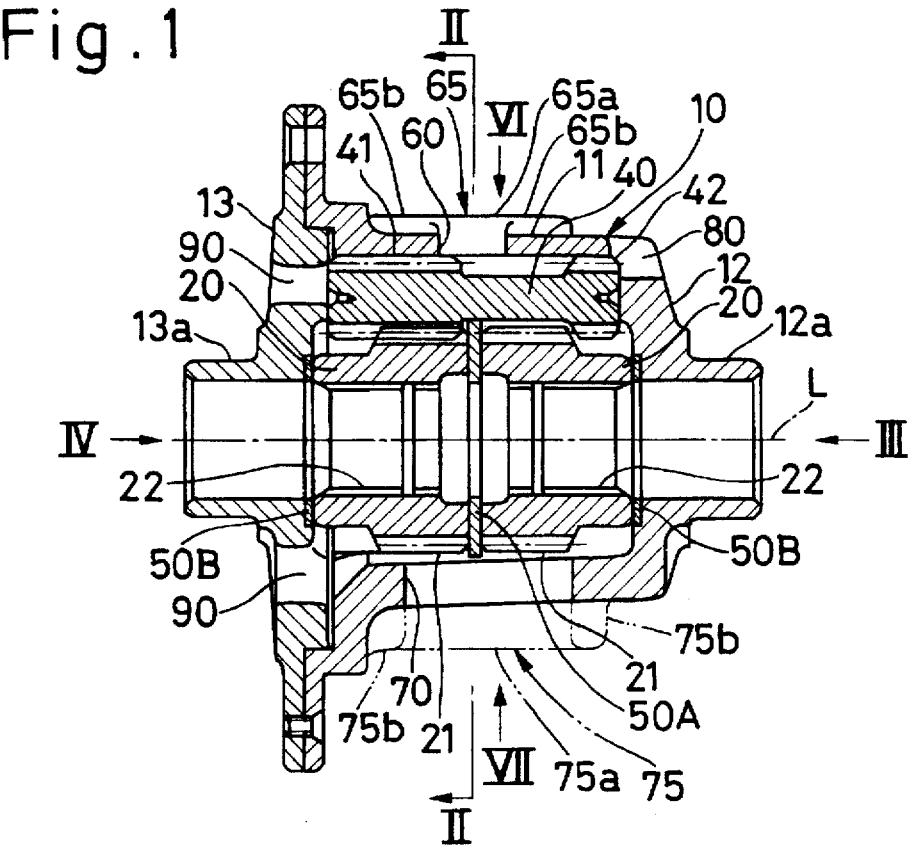
FIG. 1 is a vertical sectional view of a differential according to a first embodiment of the present invention.
Figure 2:
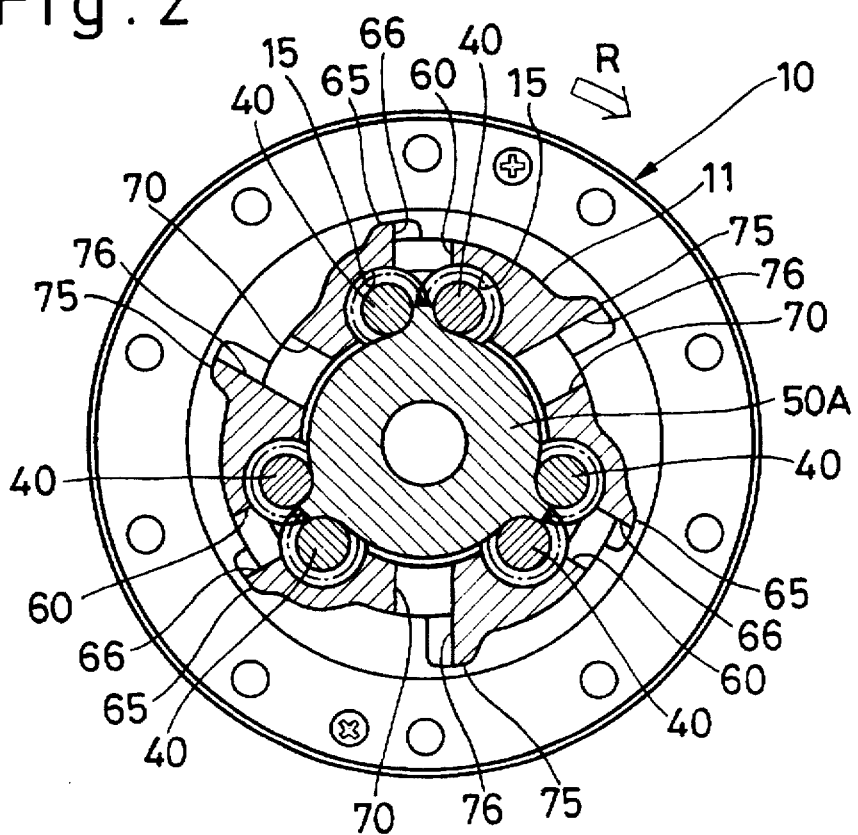
FIG. 2 is a sectional view taken on line II—II of FIG. 1.

A first embodiment of the present invention will now be described with reference to FIGS. 1 to 7. As shown in FIGS. 1 and 2, a parallel-axis differential for vehicles includes a housing 10 which is received in a differential carrier, not shown. This housing 10 includes a sleeve portion 11, an end wall 12 integral with one end of the sleeve portion 11, and a closure 13 (the other end wall) for closing an opening in the other end of the sleeve portion 11. The end wall 12 and closure 13 of the housing 10 are formed with journal portions 12a and 13a, respectively. The housing 10 is rotatably supported about an axis L through the journal portions 12a and 13a carried on bearings of the differential carrier. A ring gear (not shown) is secured to the closure 13 of the housing 10. The housing 10 receives a driving torque from an engine through the ring gear and a gear which is in engagement with the ring gear.

A pair of cylindrical sun gears 20 are rotatably received in and coaxial with the housing 10. The sun gears 20 have helical teeth 21 on their outer peripheries, respectively. The helical teeth 21 of the pair of sun gears 20 are equal to each other in helical angle. The helical direction of the helical teeth 21 of the pair of sun gears 20 may be arranged either in a reverse direction or in the same direction.

A pair of left and right axles 30 (output shafts, see FIG. 5) of the vehicle extend through the journal portions 12a and 13a, with end portions thereof being in spline-connection with spline portions 22 of the pair of sun gears 20, respectively.

As shown in FIG. 2, three pairs of pockets 15 extending in parallel relation to the axis L of the housing 1 are formed circumferentially spacedly on an inner peripheral surface of the sleeve portion 11 of the housing 10. The pockets 15 of each pair are adjacent to each other. An inner peripheral surface of each pocket 15 is cylindrical. Planetary gears 40 are rotatably received in the pockets 15, respectively. The planetary gears 40 are in parallel relation to the axis L of the housing 10. Each planetary gear 40 is provided on opposite ends thereof with a first helical teeth 41 long in an axial direction and a second helical teeth 42 short in the axial direction.

Figure 5:
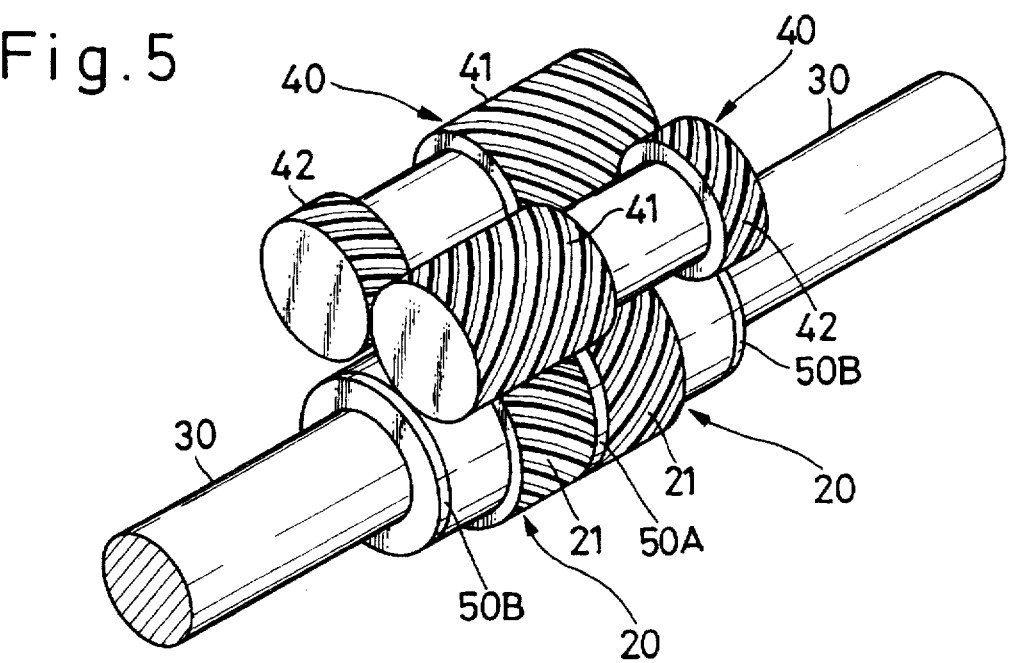
FIG. 5 is a perspective view showing a general construction of gears in the differential. In this illustration, a housing is not shown and only one pair of planetary gears are shown.
Figure 6:
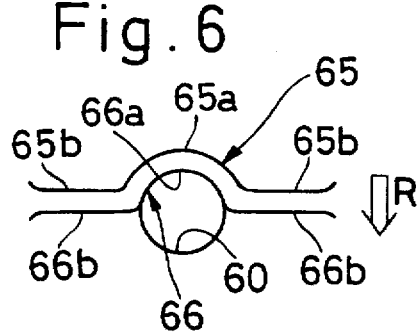
FIG. 6 is an enlarged view of a first window opening and a first fin when viewed in a direction as indicated by an arrow VI of FIG. 1.
Figure 7:
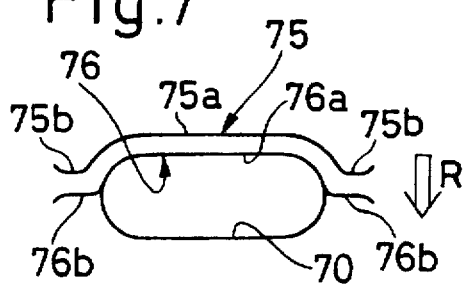
FIG. 7 is an enlarged view of a second window opening and a second fin when viewed in a direction as indicated by an arrow VII of FIG. 1.

As most clearly shown in FIG. 5, the first helical teeth 41 of one of the pair of planetary gears 40 is in engagement with one of the pair of sun gears 20 and also in engagement with the second helical teeth 42 of the other planetary gear 40. Similarly, the first helical teeth 41 of the other planetary gear 40 is in engagement with the other sun gear 20 and also in engagement with the second helical teeth 42 of the first-mentioned planetary gear 40.

As shown in FIG. 1, a thrust washer 50A is interposed between the pair of sun gears 20. Similarly, thrust washers 50B are interposed respectively between the end wall 12 of the housing 10 and one of the sun gears 20 and between the closure 13 and the other sun gear 20.

When in differential rotation, the planetary gears 40 are rotated with outer peripheral surfaces (namely, top faces of the helical teeth 41, 42) thereof being in contact with the inner peripheral surfaces of the pockets 15, respectively, and friction is generated therebetween. Friction is also generated between the pair of sun gears 20 and the thrust washer 50A. Furthermore, friction is generated between one of the sun gears 20 and the end wall 12, and between the other sun gear 20 and the closure 13, through the thrust washers 50B. A torque bias ratio is determined depending on a sum of the afore-mentioned friction.

The above-mentioned construction is basically the same as the conventional parallel-axis differential for vehicles. Next, a construction for supplying lubricating oil into the housing 10 will be described.

As most clearly shown in FIG. 2, three first window openings 60 and three second window openings 70 for introducing lubricating oil into the housing 10 are formed circumferentially alternately and at equal intervals in the peripheral wall of the sleeve portion 11. Each first window opening 60 is circular in configuration (see FIG. 6) and faced with an engaging portion between the pair of planetary gears 40. Each second window opening 70 is oblong in configuration in a direction of the axis n (see FIG. 7) and disposed between two adjacent pairs of the planetary gears 40.

Fins 65, 75 for guiding lubricating oil toward the window openings 60, 70 are formed in the sleeve portion 11 in such a manner as to project radially outwardly of the housing 10. As most clearly shown in FIGS. 6 and 7, the fins 65, 75 include primary portions 65a, 75a disposed respectively along rear edge portions (edge portions situated on a rear side in a rotating direction R of the housing 10 when the vehicle travels forwardly) of the first window opening 60 and the second window opening 70, and a pair of secondary portions 65b, 75b extending in the direction of the rotational axis L toward opposite ends of the housing 10.

Those surfaces 66, 76 of the fins 65, 75 facing the rotating direction R are provided as guide surfaces, respectively. The guide surfaces 66, 76 include primary surface portions 66a, 76a formed on the primary portions 65a, 75a and secondary surface portions 66b, 76b formed on the secondary portions 65b, 75b, respectively.

The primary surface portion 66a of the guide surface 66 of the first fin 65 is disposed along the edge portion of the rear side of the circular window opening 60. The portion 66a is in a form of a semi-cylindrical surface and continuous with a rear side portion of an inner peripheral surface of the window opening 60. As a consequence, the primary surface portion 66a is inclined such that the portion 66a project forwardly in the rotating direction R as it goes toward opposite ends of the housing 10 from the center along the axis L. It should be noted that this primary surface portion 66a and the inner peripheral portion of the first window opening 60 corresponding thereto may be flat and inclined. The pair of secondary surface portions 66b of the guide surface 66 of the first fin 65 are of flat surfaces and intersected at right angles with the rotating direction R. The primary surface portion 76a is continuous with a rear side portion of an inner peripheral surface of the second window opening 70. A central portion of the primary surface portion 76a of the guide surface 76 of the second fin 75 is of a flat surface intersecting at right angles with the rotating direction R. Opposite end portions of the primary surface portion 76a are part of a cylindrical surface. As a consequence, opposite end portions of the primary surface portion 76a are inclined such that the opposite end portions project forwardly in the rotating direction R as they go toward the opposite ends of the housing 10 along the axis L. It should be noted that the opposite end portions of the primary surface portion 76a and the inner peripheral surface portion of the second window opening 70 corresponding thereto may be flat and inclined. The pair of secondary surface portions 76b of the guide surface 76 of the second fin 75 are flat surfaces and intersected at right angles with the rotating direction R.

Figure 3:
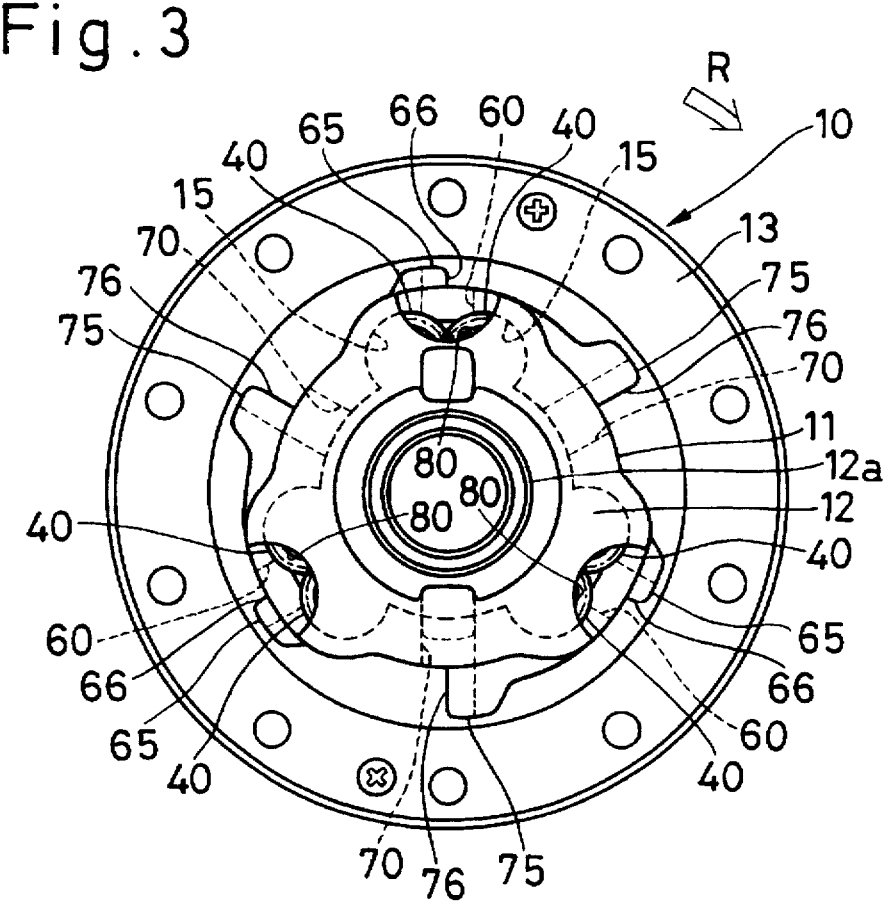
FIG. 3 is a front view of the differential when viewed in a direction as indicated by an arrow III of FIG. 1.

As shown in FIG. 3, three semi-circular third window openings 80 are formed in intersecting portions between the end wall 12 of the housing 10 and the sleeve portion 11.

Each third window opening 80 is faced with an engaging portion of end portions of the planetary gears 40 of each pair.

Figure 4:
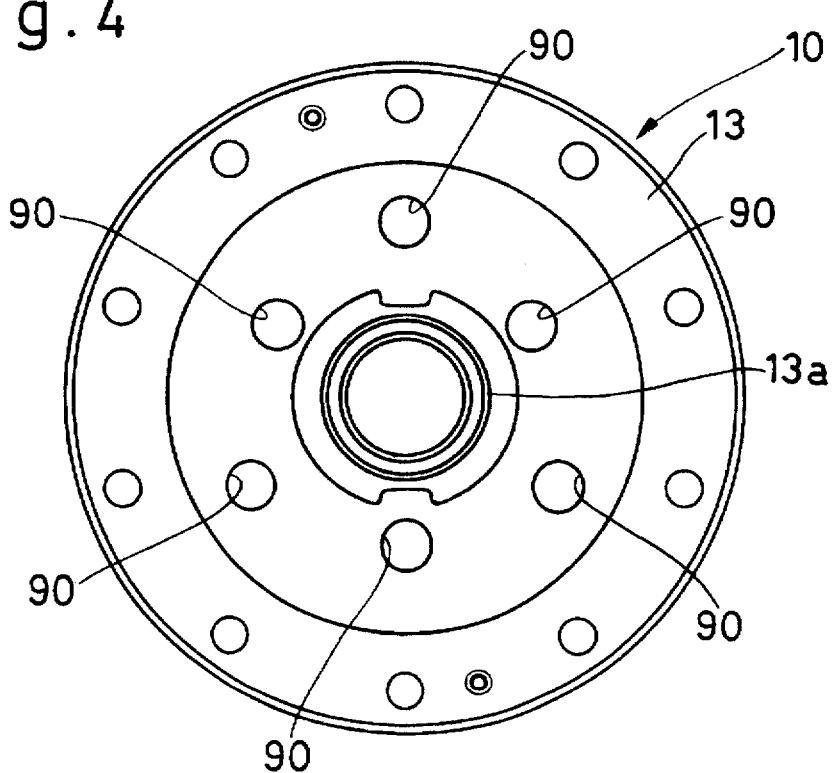
FIG. 4 is a rear view of the differential when viewed in a direction as indicated by an arrow IV of FIG. 1.

As shown in FIG. 4, six fourth window openings 90 are formed in the closure 13 of the housing 10. Three of the fourth window openings 90 are arranged such that they correspond to the three pairs of planetary gears 40, respectively, and the remaining three window openings 90 are disposed between adjacent pairs of planetary gears 40, respectively.

In the parallel-axis differential thus constructed, when the housing 10 is rotated in the rotating direction R while the vehicle is traveling forwardly, lubrication oil stored on a bottom portion of the differential carrier is brought into the housing 10 through the window openings 60, 70, 80 and 90. The lubricating oil introduced into the housing 10 is served to lubricate and cool the mating surfaces where friction is generated and the engaging portions between the gears.

Since the fins 65, 75 spoon and guide the lubricating oil toward the window openings 60, 70 respectively, much more lubricating oil can be supplied into the housing 10 through the window openings 60, 70. Accordingly, even in the presence of limitation of the opening areas of the window openings 60 70, lubrication and cooling are assuredly performed.

Since the primary surface portions 66a, 76a of the guide surfaces 66, 76 are inclined such that they prospect forwardly in the rotating direction as they go toward the opposite ends of the housing 10 along the axis L, much more lubricating oil can be guided toward the window openings 60, 70.

Since the lubricating oil can also be spooned and partly sent into the window openings 60, 70 by the secondary surface portions 66b, 76b, much more lubricating oil can be guided toward the window openings 60, 70.

Figure 8:
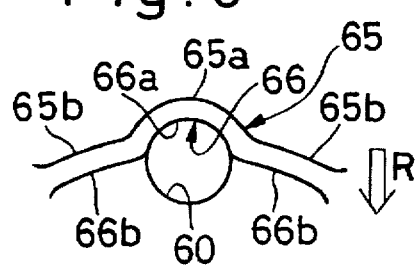
FIG. 8 is a view corresponding to FIG. 6 but showing modifications of the first window opening and the first fin, respectively.
Figure 9:
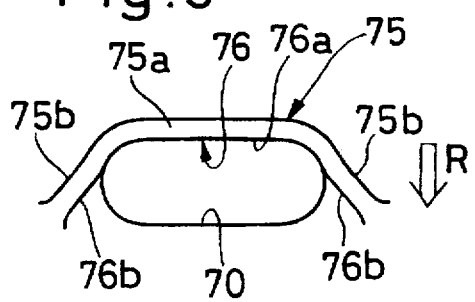
FIG. 9 is a view corresponding to FIG. 7 but showing modifications of the second window opening and the second fin.

FIGS. 8 and 9 show modified embodiments of the first and second fins 65, 75 formed on the peripheral wall of the housing 10. Secondary portions 65b, 75b of those fins 65, 75 are inclined such that they project forwardly in the rotating direction R as they go toward opposite ends of a housing along a rotational axis of the housing. As a consequence, secondary surface portions 66b, 76b of guide surfaces 66, 76 are also inclined in the same manner. According to this arrangement, lubricating oil spooned by the secondary surface portions 66b, 76b can be sent respectively into the window openings 60, 70 at a greater ratio.

Figure 10:
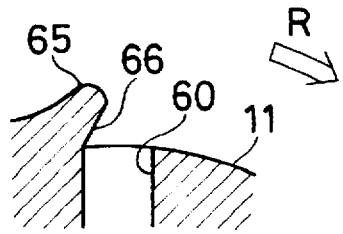
FIG. 10 is a sectional view showing further modifications of the first window opening and the first fin.
Figure 11:
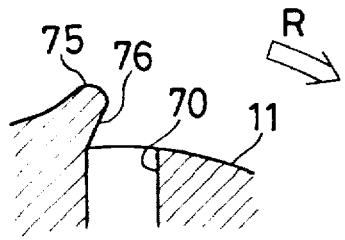
FIG. 11 is a sectional view showing further modifications of the second window opening and the second fin.

FIGS. 10 and 11 show further modified embodiments of the first and second fins 65, 75 formed on a peripheral wall of a housing. Guide surfaces 66, 76 of those fins 65, 75 are inclined such that they project forwardly in the rotating direction R as they go radially outwardly of the housing. As a consequence, lubricating oil spooned by the guide surfaces 66, 76 can be sent respectively into the window openings 60, 70 at a greater ratio.

Further embodiments of the present invention will now be described. In those embodiments, component parts corresponding to those of the first embodiment are denoted by identical reference numerals and detailed description thereof is omitted.

Figure 12:
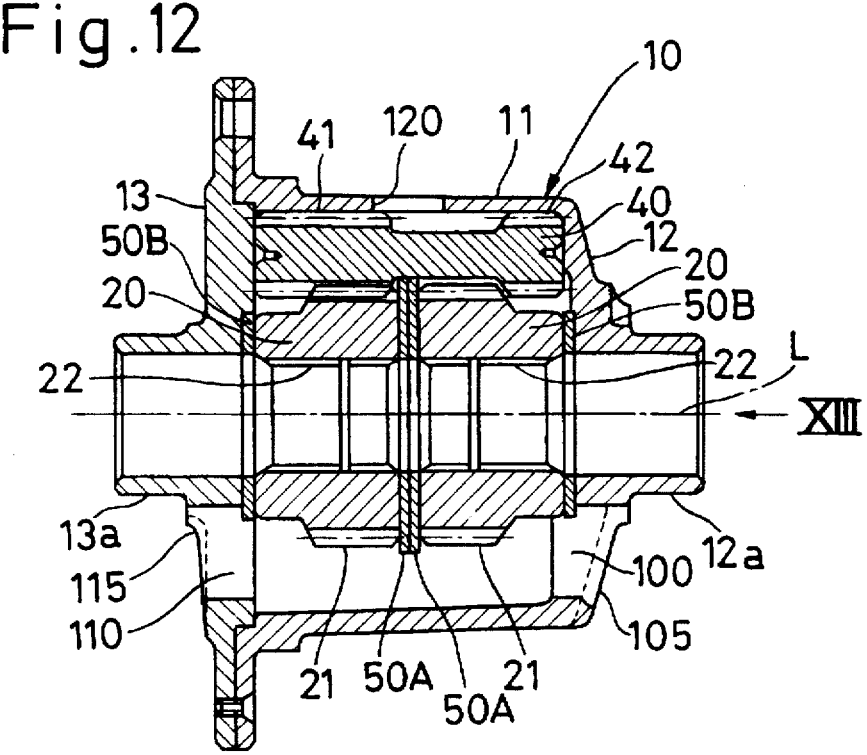
FIG. 12 is a vertical sectional view of a differential according to a second embodiment of the present invention.
Figure 13:
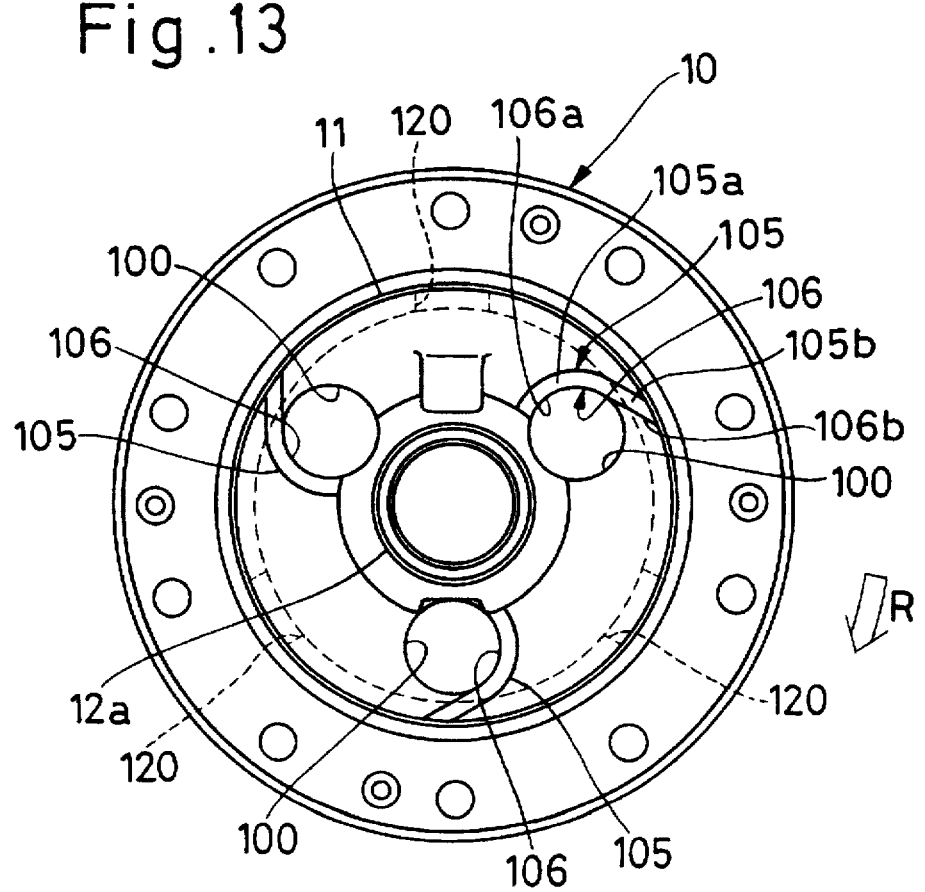
FIG. 13 is a front view of the differential when viewed in a direction as indicated by an arrow XIII of FIG. 12.

FIGS. 12 and 13 show a parallel-axis differential for vehicles according to a second embodiment of the present invention. Three circular window openings 100 are circumferentially equally spacedly formed in an end wall 12. Each window opening 100 is disposed between adjacent pairs of planetary gears 40. Also, three circular window openings 110 are likewise formed in a closure 13. Furthermore, a plurality of window openings 120 are circumferentially equally spacedly formed in a sleeve portion 11.

Three fins 105 are formed on the end wall 12 in such a manner as to correspond to the window openings 100 and project outwardly in a direction of a rotational axis L. As most clearly shown especially in FIG. 13, each fin 105 includes a primary portion 105a disposed along a rear edge portion (an edge portion situated on the rear side in a rotating direction R of the housing 10 when the vehicle travels forwardly) of the corresponding window opening 100, and a secondary portion 105b extending radially outwardly of the housing 10 from a radially external end of the primary portion 105a.

A surface 106 of each fin 105 facing in the rotating direction R is provided as a guide surface. The guide surface 106 includes a primary surface portion 106a formed on the primary portion 105a and a secondary surface portion 106b formed on the secondary portion 105b.

The primary surface portion 106a of the guide surface 106 is disposed along the rear edge portion of the corresponding window opening 100. The portion 106a is in a form of a semi-cylindrical surface and continuous with a rear side portion of an inner peripheral surface of the corresponding window opening 100. As a consequence, the primary surface portion 106a is inclined such that it projects forwardly in the rotating direction R as it goes radially outwardly of the housing 10 from the center. The secondary surface portion 106b of the guide surface 106 is flat and inclined such that it projects in the rotating direction R as it goes radially outwardly of the housing 10. Owing to a provision of the fins 106, much more lubricating oil can be supplied into the housing 10 through the window openings 100 in the same manner as the first embodiment.

Similar fins 115 as the fins 105 are also formed on the closure 13. Owing to a provision of the fins 115, much more lubrication oil can be supplied into the housing 10 through the window openings 110.

Figure 14:
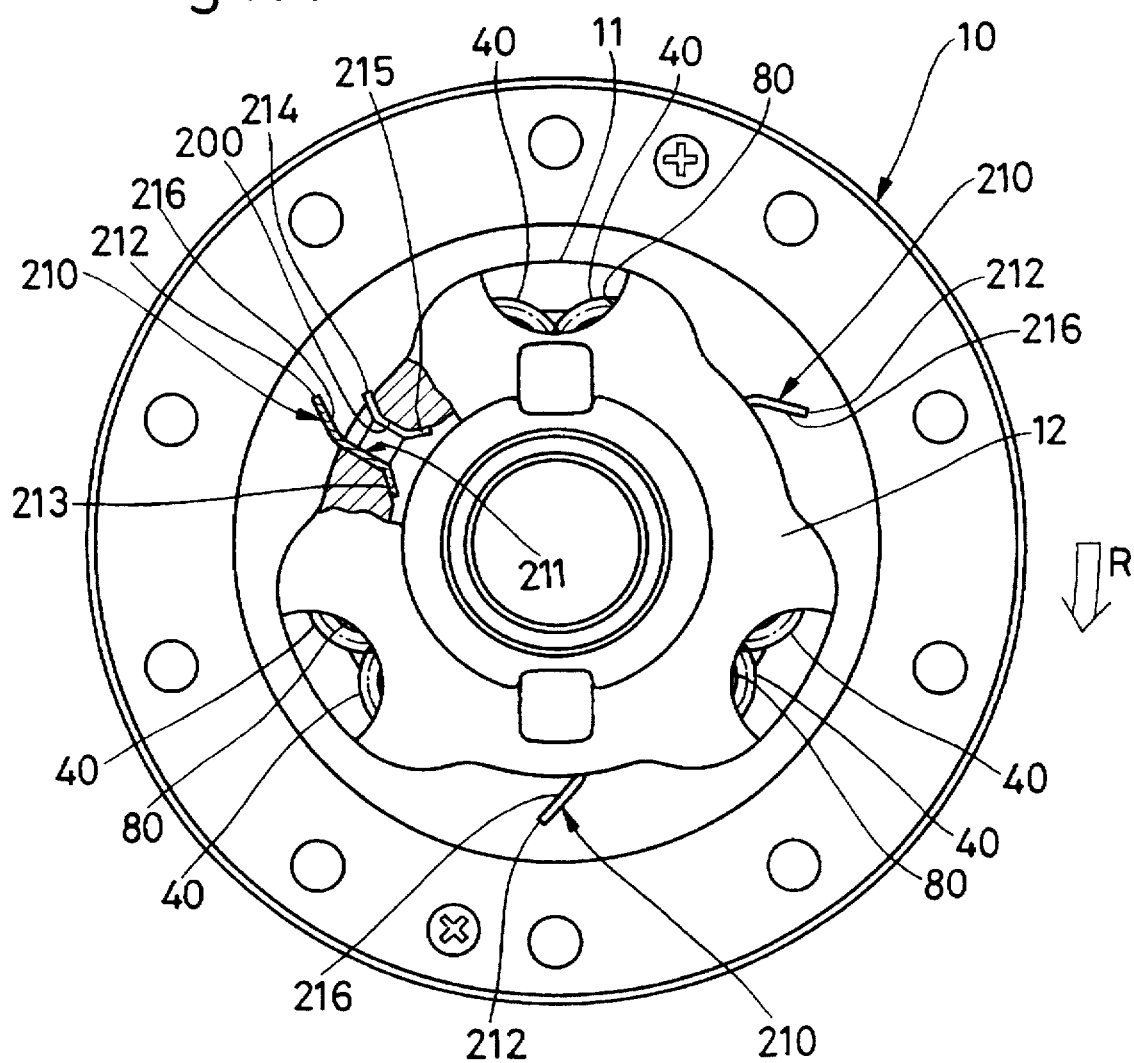
FIG. 14 is a front view, partly in section, of a differential according to a third embodiment of the present invention.
Figure 15:
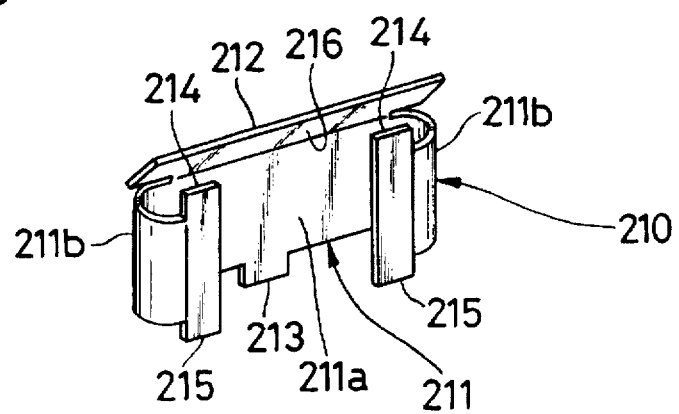
FIG. 15 is a perspective view of a fin member to be used in the third embodiment.

FIGS. 14 and 15 show a parallel-axis differential for vehicles according to a third embodiment of the present invention. Three window openings 200 are circumferentially equally spacedly formed in a sleeve portion 11 of a housing. The window openings 200 are similar in configuration to the window openings 70 of the first embodiment and formed in the same positions as the window openings 70. A plate member 210 separately situated from the housing 10 and formed by bending a metal plate is mounted on each window opening 200.

As most clearly shown in FIG. 15, the plate member 210 has a fitting portion 211. This fitting portion 211 includes a flat portion 211a to be abutted with a flat surface of the rear side (rear side when viewed in the rotating direction R of the housing 10 when the vehicle is traveling forwardly) of an inner peripheral surface of the window opening 200, and a pair of semi-cylindrical portions 211b to be abutted with inner peripheral surfaces of opposite end portions (opposite end portions in a direction of a rotational axis of the housing 10) of the window opening 200. Furthermore, the plate member 210 includes a fin 212 formed on a radially external edge of the fitting portion 211, a mounting portion 213 formed on the center of a radially internal edge of the fitting portion 211, and a pair of mounting portions 214, 215 connected respectively to the pair of semi-cylindrical portions 211b and projecting radially outwardly and radially inwardly, respectively.

As shown in FIG. 14, for attaching the plate member 210 to the corresponding window opening 200, the fitting portion 211 of the plate member 210 is inserted into the window opening 200 and the mounting portions 213, 214, 215 are bent so as to be engaged with a peripheral edge of the window opening 200. In this attaching state, the fin 212 projects radially outwardly of the housing 10 from a rear edge portion of the rotating direction R of the window opening 200. The fin 212 is inclined such that it projects forwardly in the rotating direction R as it goes radially outwardly. A surface of the fin 212 facing the rotating direction R is served as a guide surface 216.

What is claimed is:

1. A parallel-axis differential, comprising:
   (a) a housing rotatable about a rotational axis upon receipt of a rotational torque, said housing having in a peripheral wall thereof a window opening for allowing the passage of lubricating oil;
   (b) a pair of sun gears rotatably received in said housing and coaxial with said housing, said pair of sun gears being connected with end portions of a pair of coaxial output shafts, respectively;
   (c) at least a pair of planetary gears rotatably received in said housing and being parallel with the rotational axis of said housing, said planetary gears of the pair being in engagement with said pair of sun gears, respectively and also in engagement with each other; and
   (d) a fin mounted on an outer surface of the peripheral wall of said housing, said fin including a primary portion and a secondary portion, said primary portion of said fin being disposed along a rear edge of said window opening with reference to one rotating direction of said housing, said secondary portion of said fin extending from said primary portion and away from said window opening toward an end of said housing in a direction of said rotational axis.

2. A parallel-axis differential according to claim 1, wherein said primary portion of said fin is inclined such that it projects in said rotating direction as it goes toward opposite ends of said housing in the direction of said rotational axis.

3. A parallel-axis differential according to claim 1, wherein said secondary portion of said fin is inclined such that it projects in said rotating direction as it goes toward the end of said housing in the direction of said rotational axis.

4. A parallel-axis differential according to claim 1, wherein the primary portion and the secondary portion have a primary surface and a secondary surface for guiding the lubricating oil, respectively, said primary surface and the secondary surface being inclined such that they project in the rotating direction as they go radially outwardly.

5. A parallel-axis differential, comprising:
   (a) a housing rotatable about a rotational axis upon receipt of a rotational torque, said housing having end walls on opposite ends in a direction of the rotational axis of said housing, and at least one of said end walls is formed with a window opening for allowing the passage of lubricating oil;
   (b) a pair of sun gears rotatably receiving said housing and coaxial with said housing, said pair of sun gears being connected with end portions of a pair of coaxial output shafts, respectively;
   (c) at least a pair of planetary gears rotatably received in said housing and being parallel with the rotational axis of said housing, said planetary gears of the pair being in engagement with said pair of sun gears, respectively and also in engagement with each other; and
   (d) a fin mounted on an outer surface of said at least one of said end walls of said housing, said fin including a primary portion and a secondary portion, said primary portion of said fin being disposed along a rear edge of said window opening with reference to said rotating direction of said housing, said secondary portion of said fin extending radially outwardly from said primary portion of said fin and away from said window opening.

6. A parallel-axis differential according to claim 5, wherein said primary portion of said fin is inclined such that it projects in said rotating direction as it goes radially outwardly of said housing.

7. A parallel-axis differential according to claim 5, wherein said secondary portion of said fin is inclined such that it projects in said rotating direction as it goes radially outwardly of said housing.

8. A parallel axis differential, comprising:
   (a) a housing rotatable about a rotational axis upon receipt of a rotational torque, said housing having a window opening for allowing the passage of lubricating oil;
   (b) a pair of sun gears rotatably received in said housing and coaxial with said housing, said pair of sun gears being connected with end portions of a pair of coaxial output shafts, respectively;
   (c) at least a pair of planetary gears rotatably received in said housing and being parallel with the rotational axis of said housing, said planetary gears of the pair being in engagement with said pair of sun gears, respectively also in engagement with each other; and
   (d) a fin mounted on an outer surface of said housing; and said fin being disposed on the rear side of said window opening with reference to one rotating direction of said housing.
   (e) a plate member separately situated from said housing, said plate member including a fitting portion to be fitted in said window opening, and said fin formed on an external edge of said fitting portion.

* * * * *

UNITED STATES PATENT AND TRADEMARK OFFICE
CERTIFICATE OF CORRECTION

PATENT NO. : 5,669,844

DATED : September 23, 1997

INVENTOR(S) : Akinori HOMAN, Kiyonari ISHIKAWA, Hirofumi OKUDA

It is certified that error appears in the above-identified patent and that said Letters Patent is hereby corrected as shown below:

Column 8, line 4,
In the first line of item (b) in Claim 5, "receiving" should be replaced with --received in--.

Signed and Sealed this

Seventeenth Day of February, 1998

Attest:

BRUCE LEHMAN

*Attesting Officer*         *Commissioner of Patents and Trademarks*